(12) United States Patent
Ko et al.

(10) Patent No.: US 6,671,238 B1
(45) Date of Patent: Dec. 30, 2003

(54) PHYSICAL IDENTIFICATION DATA ADDRESSING METHOD USING WOBBLE SIGNAL, METHOD OF DETECTING WOBBLE ADDRESS ENCODING CIRCUIT, METHOD AND CIRCUIT FOR DETECTING WOBBLE ADDRESS, AND RECORDING MEDIUM THEREFOR

(75) Inventors: Jung-wan Ko, Yongin (KR); In-sik Park, Suwon (KR); Kyung-geun Lee, Seongnam (KR); Du-seop Yoon, Suwon (KR); Seong-sin Joo, Suwon (KR); Jae-seong Shim, Seoul (KR); Byoung-ho Choi, Suwon (KR); Byung-in Ma, Suwon (KR); Yong-jin Ahn, Seoul (KR); Tatsuhiro Otsuka, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 557 days.

(21) Appl. No.: 09/704,655

(22) Filed: Nov. 3, 2000

(30) Foreign Application Priority Data

Nov. 3, 1999 (KR) ......................................... 1999-48451
Mar. 25, 2000 (KR) ......................................... 2000-15327

(51) Int. Cl.$^7$ ................................................ G11B 7/00
(52) U.S. Cl. ................. 369/47.1; 369/47.27; 369/44.13
(58) Field of Search ........................... 369/275.3, 44.13, 369/47.28, 47.27, 44.26, 47.1

(56) References Cited

U.S. PATENT DOCUMENTS 6,028,828 A * 2/2000 Maeda ..................... 369/44.13

FOREIGN PATENT DOCUMENTS

| JP | 8-249668 | 9/1996 |
|---|---|---|
| JP | 9-17033 | 1/1997 |
| JP | 10-312541 | 11/1998 |
| JP | 11-7660 | 1/1999 |
| JP | 2000-40260 | 2/2000 |
| JP | 2001-143273 | 5/2001 |
| JP | 2001-167445 | 6/2001 |
| JP | 2001-167446 | 6/2001 |
| WO | 98/13823 | 4/1998 |
| WO | 98/54703 | 12/1998 |

* cited by examiner

*Primary Examiner*—Nabil Hindi
(74) *Attorney, Agent, or Firm*—Staas & Halsey LLP

(57) ABSTRACT

A physical identification data (PID) addressing method using a wobble signal, a wobble address encoding circuit, method and circuit for detecting the wobble address and a recording medium therefor. When addressing physical identification information on a recording medium, which has land and groove tracks in which data can be recorded, using wobbles, a wobble signal obtained by phase modulating address information indicating the physical identification information and a wobble signal having only a carrier are repeatedly alternatively recorded on both walls of either of a groove track and a land track by way of time division multiplexing. Accordingly, land and groove addresses can be detected by the same method, and the land track can be easily discriminated from a groove track by making the sizes of the addresses different in the land and groove tracks.

70 Claims, 11 Drawing Sheets

FIG. 9E

| SM | PID#n | PID#n | PID#n | SM | PID#n+1 | PID#n+1 | PID#n+1 |
|----|-------|-------|-------|----|---------|---------|---------|
| SM | | | | SM | | | |
| SM | PID#n+2m | PID#n+2m | PID#n+2m | SM | PID#n+2m+1 | PID#n+2m+1 | PID#n+2m+1 |

PHYSICAL IDENTIFICATION DATA ADDRESSING METHOD USING WOBBLE SIGNAL, METHOD OF DETECTING WOBBLE ADDRESS ENCODING CIRCUIT, METHOD AND CIRCUIT FOR DETECTING WOBBLE ADDRESS, AND RECORDING MEDIUM THEREFOR

CROSS-REFERENCE TO RELATED APPLICATIONS

This application claims the benefit of Korean Application Nos. 99-48451, filed Nov. 3, 1999 and 00-15327, filed Mar. 25, 2000, in the Korean Patent Office, the disclosure of which is incorporated herein by reference.

BACKGROUND OF THE INVENTION

1. Field of the Invention

The present invention relates to optical recording/reproducing, and more particularly, to a physical identification data (PID) addressing method using a wobble signal, a wobble address encoding circuit, a method and circuit for detecting the wobble address, and a recording medium in a high density optical recording and reproducing system.

2. Description of the Related Art

Information used for physical location recognition to determine a location to which data is written on a disc in an optical recording and reproducing system is referred to as physical identification data (PID). Generally, PID is address information of a physical sector in a recording medium on which data is recorded in units of sectors. This is essential information for recording data at a certain location on a disc and finding the location at a later time.

In other words, PID indicates address information for finding a specified sector to record/reproduce data to/from a certain location, particularly in a recording/reproducing disc, and indicates address information of a sector which is pre-mastered during manufacture of a disc regardless of existence or non-existence of user data. Accordingly, PID is supposed to be resistant to errors and have a structure allowing fast detection in order to exactly and quickly find the location of a sector which data will be recorded on or reproduced from.

Various methods of recording PID on a disc can be largely classified into two methods. One method is recording physical location information on a disc by forming embossed pits in the same pattern as that used in a read-only optical disc to allow a certain location on the disc to be detected based on the embossed pits. The other method uses a wobble signal which can be obtained by giving some changes to recording tracks on a disc at a predetermined time interval.

An area, which is provided for performing PID addressing using the former method, that is, using embossed pre-pits, is referred to as a header field, as shown in FIG. 1. According to a digital versatile disc (DVD) specification for rewritable disc (2.6 or 4.7 gigabytes (GB) DVD-random access memory (RAM)) version 1.0, physical location information is recorded at the location of the so called header field, which is composed of pre-pits, during manufacture of a substrate. The header field includes a variable frequency oscillator (VFO) area for phase locked loop (PLL), a PID area to which a sector number is assigned, an ID error detection (IED) area for storing ID error detection information and a postamble (PA) area for synchronizing an initial phase for modulation of data recorded following the header field. In a PID addressing method using pre-pits, such a header field comprising embossed pre-pits is appropriately disposed at the start of a sector to allow a pickup to easily find and move to a desired location using this information. A sector number, sector type and a land track/groove track can be recognized from the addressed information, and even servo control is possible.

In such a PID addressing method using conventional embossed pre-pits, data cannot be recorded in areas in which pits are formed. Therefore, a problem of a decrease in recording density in proportion to the areas where the pits are formed occurs.

To store a large amount of data with a high density, it is necessary to increase a recordable area (a user data area) by decreasing a track pitch and minimizing a non-recordable area (overhead). For this purpose, it is effective to use a wobble signal.

When forming a substrate for a recording disc, grooves are formed along recording tracks on the substrate to allow a certain track to be exactly tracked by a pickup even if data is not recorded on the track. The portions other than the grooves are referred to as lands. Recording methods can be classified into a method of recording data on either a land or a groove and a method of recording data on both the land and the groove. It is more advantageous to use the land and groove recording method in which data is recorded on both the land and the groove as the density of data increases.

In addition, a method of generating a signal of a specified frequency by varying both walls of a groove to use it as an auxiliary clock signal during recording is used. This signal is referred to as a wobble signal. A wobble signal having a single frequency is also recorded in the substrate of a DVD-RAM disc.

In a PID addressing method using a wobble signal, overhead information such as a PID signal can be recorded by varying a wobble signal having a single frequency, for example, periodically varying the phase or frequency of the wobble signal, during recording. Here, the PID signal embedded in the wobble signal is generally referred to as a wobble address.

Since the conventional PID addressing method using a wobble signal uses the variation of both walls of a groove track in which a wobble will be recorded, as shown in FIG. 2, the method can be used only in discs employing a land recording method in which information is not recorded in groove tracks. In other words, when using changes in both walls of each groove track, address information of two groove tracks at both sides of a land track can be mixed with each other, so that exact information cannot be obtained from the land track. Accordingly, both the addresses of a land track and a groove track cannot be indicated just by using a wobble address formed in the groove track. Therefore, it is difficult to use the conventional method in discs employing a land and groove recording method in which information is recorded in both land and groove tracks.

Although a wobble address is recorded in the side wall of a groove track at the boundary between a land track and the groove track, information of wobbles formed in both walls of the land and groove tracks is simultaneously read when the land and groove recording method of recording information in land and groove tracks is used. Accordingly, a PID signal cannot be exactly recorded or detected when using the wobble addressing method shown in FIG. 2.

To solve this problem, a method of recording a wobble address in only one wall of each groove track is proposed, as shown in FIG. 3. In this wobble addressing method, however, since a wobble signal is generated from only one wall of a groove track, the strength of the signal decreases. In addition, since the same signal is read from the groove track and an adjacent land track, additional information for discriminating a land track from a groove track is required.

SUMMARY OF THE INVENTION

To solve the above problems, a first object of the present invention is to provide a new physical identification data (PID) addressing method using a wobble to solve an overhead problem of an addressing method using embossed pre-pits, and to solve a problem of a conventional wobble addressing method being incompatible with a land and groove recording method.

A second object of the present invention is to provide a PID addressing method in which a simple carrier wobble signal and phase-modulated wobble address information is time division multiplexed in both walls of either of the groove and land tracks using two beams.

A third object of the present invention is to provide a method of detecting address information from a simple carrier wobble signal and phase-modulated address information which is recorded in both walls of either of the groove and land tracks by way of time division multiplexing.

A fourth object of the present invention is to provide a wobble address encoding circuit for a high density optical disc recording and reproducing system.

A fifth object of the present invention is to provide a wobble address detecting circuit for a high density optical disc recording and reproducing system.

A sixth object of the present invention is to provide a recording medium in which a simple carrier wobble signal and phase-modulated address information, which is time division multiplexed, is recorded in both walls of either of the groove and land tracks.

Additional objects and advantages of the invention will be set forth in part in the description which follows and, in part, will be obvious from the description, or may be learned by practice of the invention.

In order to achieve the above object, the present invention provides a method of addressing physical identification information using a wobble on an optical recording medium having land and groove tracks. The method includes alternately recording a simple wobble carrier and wobble address information on both walls of either of a groove track and a land track, the wobble address information being phase modulated with two phases having a maximum possible phase difference therebetween using the simple wobble carrier, wherein the simple wobble carrier is recorded in a section of an adjacent track corresponding to a section in which the wobble address information is recorded in a current track.

The present invention also provides a method of detecting a wobble address from an optical recording medium, in which a simple wobble carrier and address information, which is phase modulated with two phases having a maximum possible phase difference therebetween using the simple wobble carrier, are alternately recorded on both walls of either of a groove track and a land track, and the simple wobble carrier is recorded in a section of an adjacent track corresponding to a section in which the phase modulated address information is recorded in a current track, in an optical recording and reproducing system having an optical detecting device. The method includes recovering the wobble carrier from the sum of a sum signal and a push-pull signal of radially half-divided output signals of the optical detecting device, providing an output signal having an original signal component and a harmonic component by multiplying the push-pull signal by the wobble carrier, and removing the harmonic component from the output signal and demultiplexing the original signal component to recover land and groove address information.

The present invention also provides a circuit which encodes an address using a wobble in an optical recording and reproducing system. The circuit includes a generator which generates a wobble signal having only a simple carrier, a phase modulator for phase modulating land and groove address information indicating physical identification information with two phases of the wobble signal having the maximum possible phase difference, and a time division multiplexer which time division multiplexes the wobble signal and the phase modulated wobble address information in both walls of either of a groove track and a land track, at a predetermined time interval.

The present invention also provides a circuit for detecting a wobble address from an optical recording medium, in which a simple wobble carrier and address information, which is phase modulated with two phases having the maximum possible phase difference therebetween using the simple wobble carrier, are alternately recorded on both wall of either of a groove track and a land track, and the simple wobble carrier is recorded in a section of an adjacent track corresponding to a section in which the phase modulated address information is recorded in a current track, in an optical recording and reproducing system having an optical detecting device. The circuit includes a wobble clock recoverer which detects a wobble clock signal from the sum of a sum signal and a push-pull signal of radially half-divided output signals of the optical detecting device, a phase demodulator which provides an output signal having an original signal component and a harmonic component by multiplying the push-pull signal by the wobble clock signal, and a demultiplexer which low pass filters the harmonic component of the output signal and demultiplexes the original signal component to recover land and groove address information.

The present invention also provides a recording medium employing a groove and land recording method, on which recording medium a simple wobble carrier and wobble address information are alternately recorded on both walls of either of a groove track and a land track, the wobble address information being phase modulated with two phases having the maximum possible phase difference therebetween using the simple wobble carrier, and the simple wobble carrier is recorded in a section of an adjacent track corresponding to a section in which the wobble address information is recorded in a current track.

BRIEF DESCRIPTION OF THE DRAWINGS

The above objects and advantages of the present invention will become more apparent by describing in detail preferred embodiments thereof with reference to the attached drawings in which:

FIGS. 9A through 9E are diagrams showing examples of the contents of the sector mark shown in FIG. 8;

DETAILED DESCRIPTION OF THE INVENTION

Hereinafter, a physical identification data (PID) addressing method using a wobble signal, a wobble address encoding circuit, a method and circuit for detecting the wobble address, and a recording medium therefor will be described with reference to the accompanying drawings, in which preferred embodiments of the invention are shown.

When reading a wobble address, which is formed using both sidewalls of a groove track, from a land track, a signal is read from the wall of each of the groove tracks at both sides of the land track, so that the signals from the adjacent walls of the adjacent grooves are combined. To process this combined signal without allowing interference of a wobble signal between adjacent tracks, the present invention provides a PID addressing structure using a wobble, as shown in FIG. 4.

Figure 1:
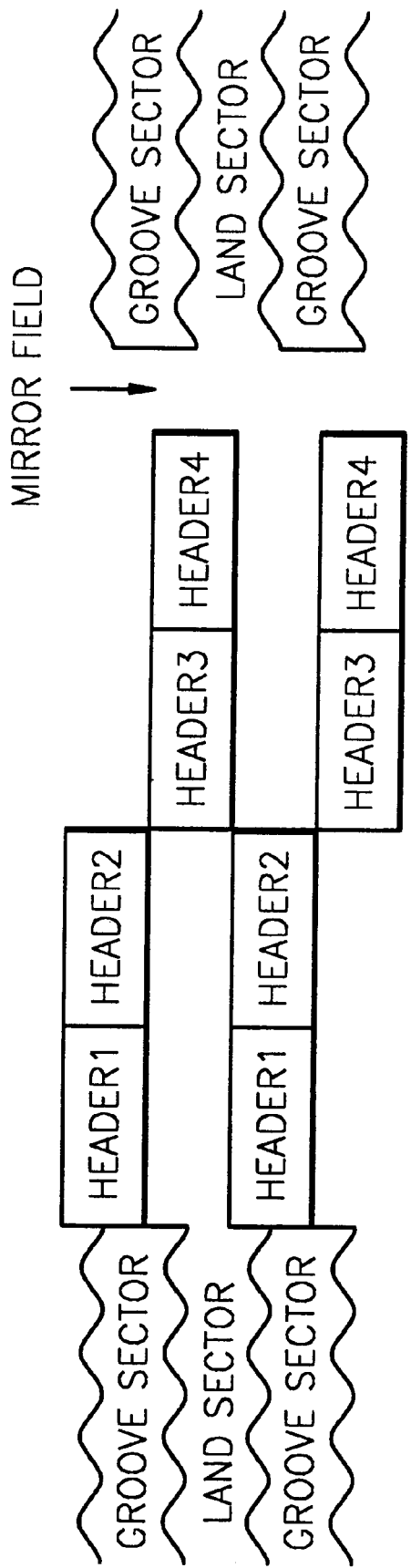
FIG. 1 is a diagram showing a physical identification data (PID) addressing structure using conventional embossed pre-pits.
Figure 2:
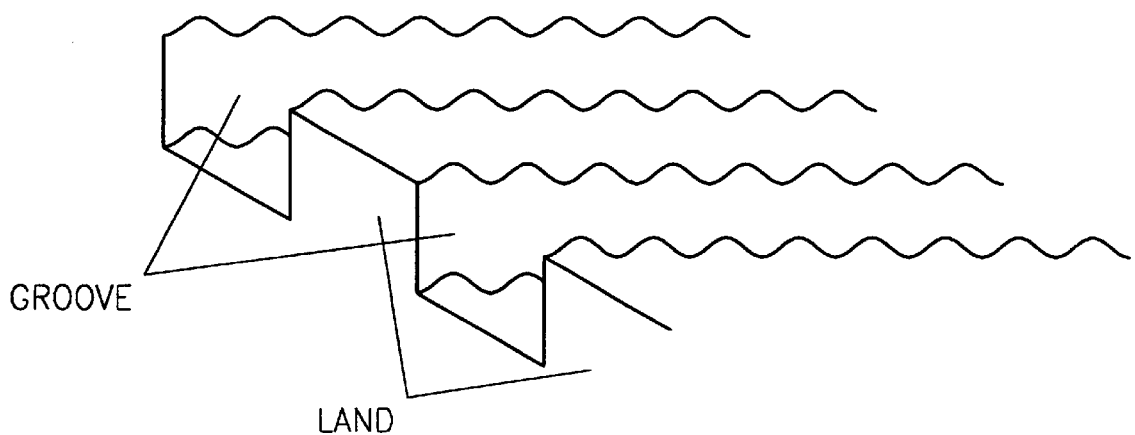
FIG. 2 shows a conventional example in which wobbles are recorded in groove and land tracks.
Figure 3:
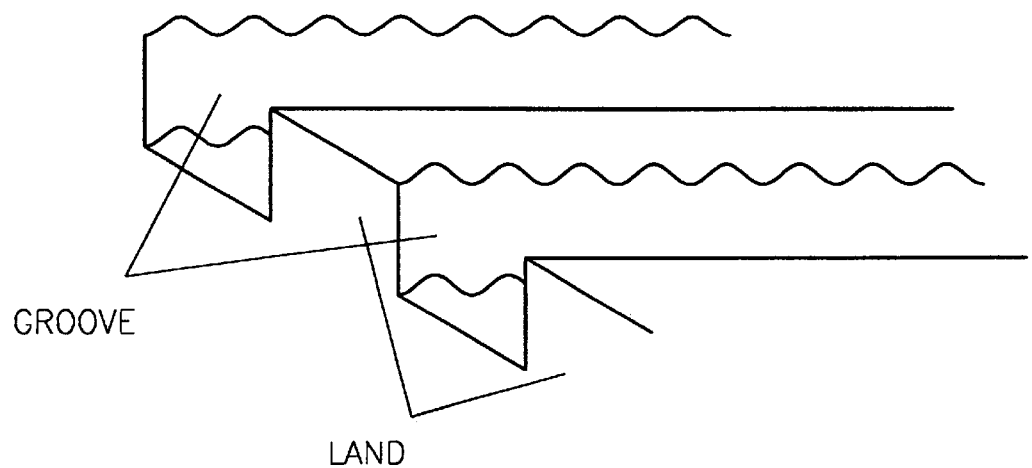
FIG. 3 is a conventional example in which a wobble address is recorded in one wall of a groove track.
Figure 4:
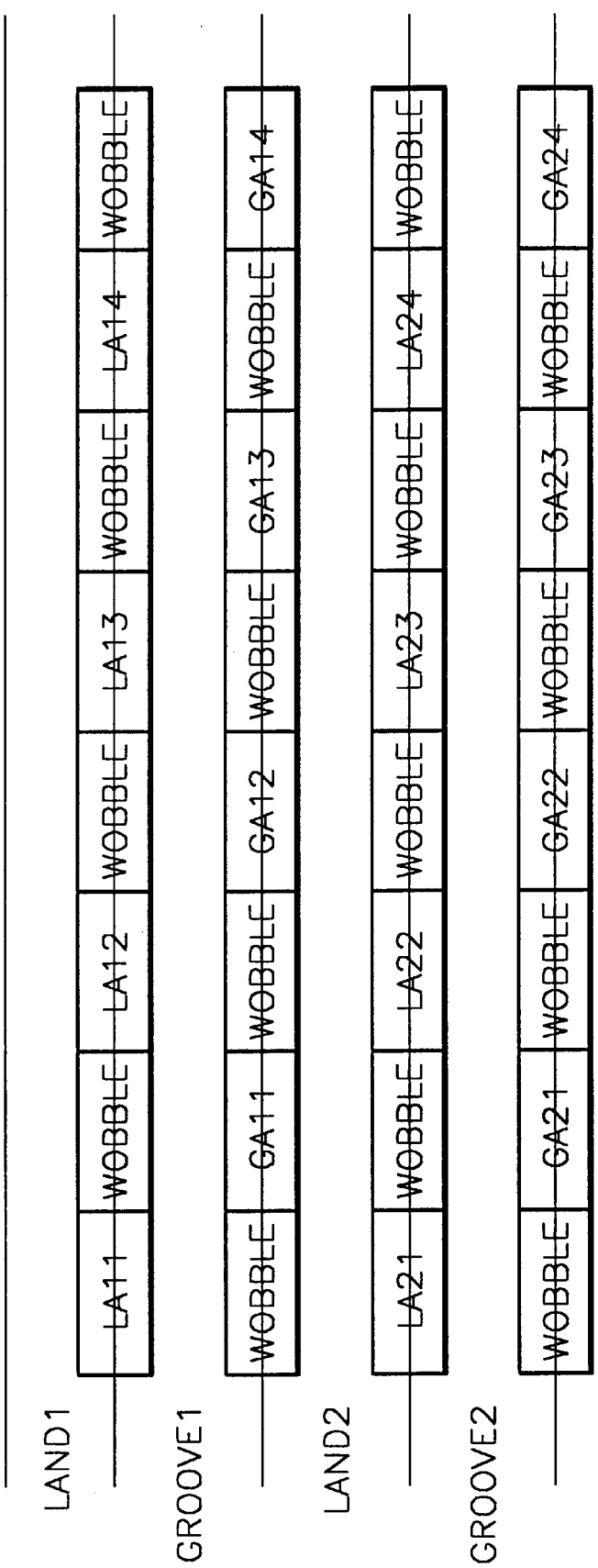
FIG. 4 is a diagram showing a PID addressing structure in which a wobble address is recorded by time division multiplexing according to the present invention.

FIG. 4 is a diagram showing a PID addressing structure using wobbles, which allows addresses to be independently recorded in land and groove tracks, according to the present invention. This structure is applied to a disc in which physical locations on land and groove tracks are to be individually accessed, for example, a disc employing a land and groove recording method, in which tracks are formed to have a constant angular velocity such as a zoned constant linear velocity (ZCLV) or a constant angular velocity (CAV) between adjacent tracks. Here, since it is designed that the shapes of the walls of a groove are different, it is preferable to use two beams during mastering.

Address data is arranged in land and groove tracks by repeatedly arranging, that is, multiplexing in a temporal domain (time division multiplexing), a section in which only a wobble carrier is formed and a section in which phase-modulated address information is formed. Here, the phase modulation uses phase shift keying (PSK) modulation. A wobble signal having a phase of 0 degrees is recorded when an address data bit is "0b", and a wobble signal having a reverse phase of 180 degrees is recorded when an address data bit is "1b". In addition, groove tracks are divided into odd and even tracks, and address data are alternately disposed in odd and even tracks.

In addition, land address data and groove address data are alternately located at different positions between adjacent walls of a track. Each of the land and groove addresses is multiplexed in units of one bit or a predetermined size. A land track can be discriminated from a groove track by multiplexing an address and a wobble carrier such that the size of a land address is larger or smaller than a groove address in the land track, although an order in which the land address and the groove address alternate with each other is fixed.

In other words, the relation between a groove address and a land address depends on which of them is first recorded. For example, in the case in which a groove address is prior to a land address and address information indicating a sector number is assigned to a disc outwardly, when a groove address is recorded in the outer wall of a groove track and a land address is recorded in the inner wall of the groove track, a groove address (a sector number) has a larger value than a land address in a groove track, and a land address (a sector number) has a larger value than a groove address in a land track. On the contrary, when a land address is recorded in the outer wall of a groove track and a groove address is recorded in the inner wall of the groove track, a land address has a larger value than a groove address in a groove track, and a groove address has a larger value than a land address in a land track.

When manufacturing a substrate, grooves are formed on the substrate using a laser beam. At this time, a wobble signal is formed by displacing the laser beam by the size of the wobble signal in a direction perpendicular to a tracking direction. Wobbles having different shapes for either wall of a groove, as embodied in the present invention, cannot be formed with a single beam. Accordingly, it is preferable to use two beams to form different wobbles in either wall of a groove. Alternatively, a beam having a diameter much smaller than the width of a track may be displaced by a desired track width in a direction perpendicular to a tracking direction. However, it is difficult to obtain a beam having a diameter sufficiently smaller than the width of a track when the width of the track is narrower for high density recording.

When using two beams, land and groove addresses can independently be recorded, as shown in FIG. 4, so that more exact land and groove addressing can be achieved, and a method and circuit for detecting an address can be equally applied for land and groove tracks.

Figure 5:
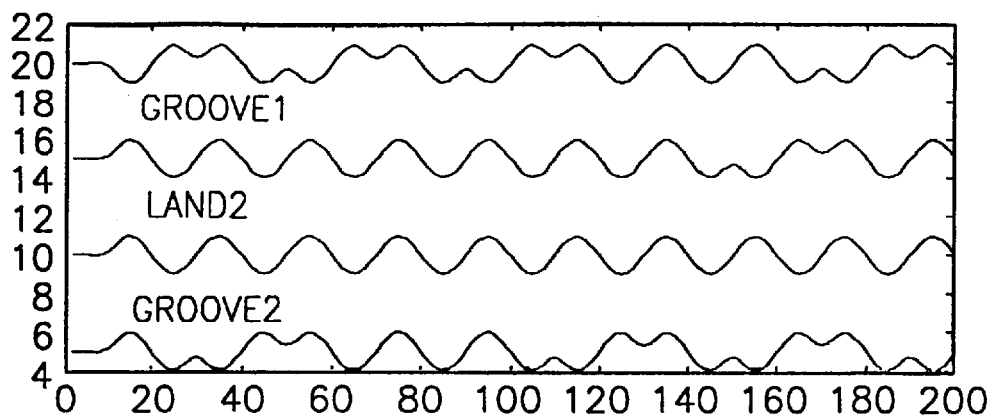
FIG. 5 is a diagram showing waveforms of a wobble signal in land and groove tracks in the structure shown in FIG. 4.

Examples of the waveforms of wobble signals in land and groove tracks in the structure shown in FIG. 4 are shown in FIG. 5. When address data is "0b", a wobble signal having a phase of 0 degrees is recorded. When address data is "1b", a wobble signal having a phase of 180 degrees is recorded.

A wobble signal resulting from phase modulation of address data can be expressed by the following equation.

$$W_{addr} = a(nT) \cdot \sin(2\pi ft) \quad (1)$$

where T is the sample period of address data, f is the frequency of a wobble, and a(nT) has an address value "1" or "−1" in a period T depending on each bit value of the address data. The variation period T of the address data exceeds the period 1/f of the wobble signal.

A wobble signal having only a carrier can be expressed by the following equation.

$$W_{carrier} = \sin(2\pi ft) \quad (2)$$

As shown in FIGS. 4 and 5, when an address is arranged by way of time division multiplexing, and when the period of a wobble signal is Tw, a wobble signal, which is formed by phase-modulating the address information at kTw periods where k is an arbitrary constant larger than 0 (k>0), and a wobble signal simply having a carrier are repeatedly recorded such that the wobble carrier alternates with the wobble address information at different positions in land and groove tracks so that the wobble address information is not recorded in the land track corresponding to a section where the wobble address information is recorded in the groove track. For example, when a wobble carrier and wobble address information are sequentially repeated in a groove track, wobble address information and a wobble carrier are sequentially repeated in a land track. Here, kTw is defined as a multiplexing period used for multiplexing a wobble carrier and wobble address information, and Tw is defined as the period of a wobble clock signal.

When PSK modulating address information using a wobble signal of a single frequency as a carrier, it is preferable that the period of the address information is at least larger than the period of the wobble signal. That is, it is preferable that the constant $k \geq 1$. When the period of address information is T, the Nyquist band of the address information is $1/(2T)$. Accordingly, the frequency of a carrier must be higher than the band of the address information to allow smooth PSK modulation.

In the actual case of standardized digital data, since spectrums are repeated, address data are to be low pass filtered to transmit only the Nyquist band. In this case, complete filtering is actually impossible, and synchronous demodulation is possible when the phase of a modulating signal is synchronized with the phase of a modulated signal. In this point, it is preferable that the constant k is set to 1 or a larger value such that it can have a constant relation with respect to a carrier frequency. In an embodiment of the present invention, k=1.

Here, as shown in FIG. 5, both walls of a land track may be either in-phase or 180° out of phase depending on the value of address data recorded in an adjacent groove track. Similarly, both walls of a groove track may be either in-phase or 180° out of phase depending on the value of address data recorded in an adjacent land track. Accordingly, when wobble signals recorded in both walls of a track have the same phase, a wobble signal is detected from a difference signal (referred to as a push-pull signal) between the two output signals of an optical detecting device, which are divided in a radial direction. When wobble signals recorded in both walls of a track have reverse phases, a wobble signal is detected from a sum signal of the two output signals of an optical detecting device, which are divided in a radial direction.

Accordingly, when a signal, which is detected from a push-pull signal, and which is obtained by phase modulating the address information of a land track, is represented by a(nT), and a signal, which is detected from a push-pull signal, and which is obtained by phase modulating the address information of a groove track, is represented by b(nT), the two signals a(nT) and b(nT) are repeated at kTw periods in a signal c(nT) which is the sum of the two signals.

In other words, when a(nT)={a0, a1, a2, ... }, b(nT)={b0, b1, b2, ... }, and k=1, c(nT)={a0, b0, a1, b1, a2, b2, ... }. The wobble signal of a land track, in which the wobble signals of two groove tracks adjacent to the land track are combined, or the wobble signal of a groove track, in which the wobble signals of two land tracks adjacent to the groove track are combined can be expressed by the following equation.

$$W_{land,groove}=\sin(2\pi ft)+c(nT)\cdot\sin(2\pi ft) \tag{3}$$

Here, since the value of c(nT) is set to 1 or −1 (to make wobble signals have a phase difference of 0 degrees, that is, in-phase, when address data is "0b", and to make wobble signals have a phase difference of 180 degrees, that is, one wavelength out of phase, when address data is "1b"), an actual wobble signal is detected from a push-pull signal in a section where address data is "0b", and where a carrier and a phase modulated wobble signal are in-phase, while a wobble signal is not detected from a push-pull signal in a section where address data is "1b", and where a carrier and a phase modulated wobble signal are 180° out of phase. Address data corresponding to a final PID is the result of demultiplexing the multiplexed land and groove addresses of two adjacent land and groove tracks.

In a sum signal, an opposite phenomenon occurs. A wobble signal is not detected from the sum signal in a section where address data is "0b", and a wobble signal is detected from the sum signal in a section where address data is "1b".

Figure 6:
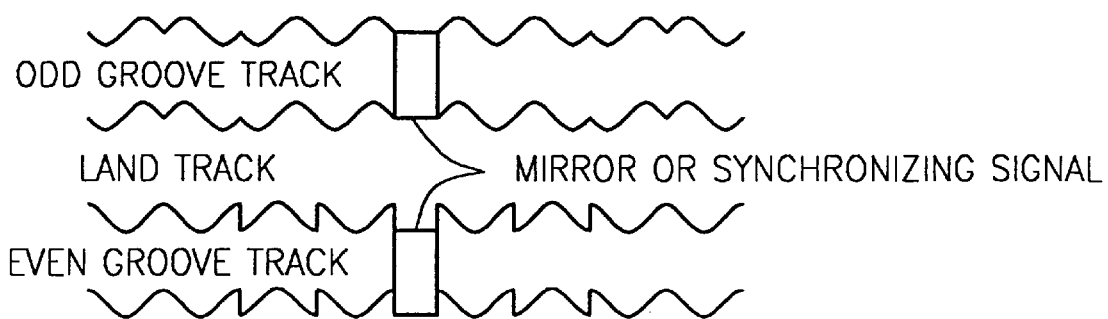
FIG. 6 is a diagram showing a track structure in which a mirror or a wobble synchronizing signal for synchronizing the phases of wobble signals at an initial stage is recorded according to the present invention.

Meanwhile, it is very important to detect the initial phase of a wobble signal. Accordingly, it is preferable to record a mirror zone or a synchronizing signal which can synchronize the phases of wobble signals in each sector or in each specified unit, as shown in FIG. 6. This will be more fully described in FIGS. 8 and 9. Additionally, in the case of a complementary allocated pit address (CAPA) method used in DVD-RAMs, a CAPA signal and a variable frequency oscillator (VFO) signal embedded in the CAPA signal can be used as a reference phase signal for a wobble signal.

When detecting wobble addresses from land and groove tracks in which PID is addressed using wobbles, a phase-modulated push-pull signal is multiplied by a carrier, that is, a wobble clock signal, to detect the phase component of an original signal (address data). In other words, when a phase-modulated signal is multiplied by a carrier, an original signal expressed as a direct current (DC) term and a harmonic component with a doubled frequency are generated as shown in the following equation.

$$a(nT)\sin(\omega t)\cdot\sin(\omega t)=\tfrac{1}{2}\cdot a(nT)-\tfrac{1}{2}\cdot a(nT)\cos(2\omega t) \tag{4}$$

where $\omega=2\pi f$. The original signal component (phase component) remaining after the doubled harmonic component is low pass filtered is recovered to binary data by a slicer. Since the recovered signal has undergone multiplexing, multiplexed land and groove addresses are to be demultiplexed to obtain the desired address data.

In addition, when the period of address information with respect to that of a carrier is synchronized in a simple ratio such as 1:1 or 1:2, a synchronous detection method of simply detecting the phase of a signal can be used. The synchronous detection method extracts the phase of a signal by multiplying a phase-modulated signal by a carrier and then detecting only the size of a signal at a predetermined time interval, instead of low pass filtering the signal. Such a method of detecting a PSK signal is widely known, and thus a detailed description thereof will be omitted.

The PID structure of a wobble signal using the variation in both walls of a groove track according to the present invention will now be more fully described.

It is preferable that address information on a single sector is repeated three times or more. For PID information, the amount of address information to be processed is much smaller than the size of the error correction code (ECC) block of usual user data so that ECC efficiency decreases and the possibility of erroneous correction increases. Accordingly, it is more effective to repeatedly record PID information than to increase the number of bits for error correction. It is typical to use an error detection code (EDC) for error correction of address information.

In the case of recording PID information by loading the PID information on a wobble by way of phase modulation according to the present invention, when a wobble signal is made to have a regular period, the physical length of a sector increases as the size of the sector increases, so that more periods of a wobble signal can be recorded. Accordingly, the size of the PID information increases. On the other hand, when the size of a sector is too large, the minimum recording unit of data also becomes too large, resulting in inefficiency.

It is preferable that the size of a sector is as close to the size of an ECC block as possible. An ECC processing unit is a minimum recording unit. When the size of a sector is set to be smaller than the size of an ECC block, all sectors constituting an ECC block including a sector, in which information will be recorded or modified, should be read, and, after recording/modification of data, ECC information should be updated. As described above, a recording process requires a complex read-modify-write procedure.

For reference, existing 4.7-GB DVD-RAMs comprise 32-kilobyte (Kbyte) ECC blocks and 2-Kbyte sectors. The length of the recordable field of a sector is 41072 channel bits.

However, it is preferable to increase the size of a sector used in 4.7-GB DVD-RAMs for high density recording. In the case of high density recording, the size of a correctable error decreases compared to the existing 4.7-GB DVD-RAMs when the size of an ECC processing unit is not increased, so it is preferable to increase the size of the ECC processing unit to ensure that the size of a correctable error is the same as that required in the existing 4.7-GB DVD-RAMs. Accordingly, it is preferable to increase the size of a sector to, for example, 4, 8 or 16 Kbytes. When the size of a sector is set to 4 Kbytes, and when existing overhead information is maintained as it is, the number of channel bits per sector is 82144.

When the period of channel data to be recorded is represented by Ts, the period of a wobble signal is represented by Tw, and the period of PID data is represented by Tpid, the following description concerns the effects resulting from changes in these periods.

The period Ts of channel data determines a recording density on a disc. As the period Tw of a wobble signal increases, the frequency of the wobble signal decreases, and the wobble signal closes to or invades the band of a servo signal such as a tracking error signal. On the other hand, as the period Tw of a wobble signal decreases, the frequency of the wobble signal increases, and the wobble signal closes to or invades a radio frequency (RF) signal band at which user data is recorded. Accordingly, it is essential to appropriately set the band of a wobble signal. In the present invention, the period Tw of a wobble signal is larger than 50Ts and smaller than 450Ts (50Ts<Tw<450Ts). For reference, the period Tw of a wobble signal is set to 186Ts in 4.7-GB DVD-RAMs.

The period Tpid of PID data determines the bandwidth of a modulated signal when the PID data is modulated using a wobble carrier. When the period Tpid of PID data is the same as the period Tw of a wobble signal (Tpid=Tw), and when the frequency of the wobble signal is represented by fw, the bandwidth of the modulated signal is 2fw. When the period Tpid of PID data is double the period Tw of a wobble signal (Tpid=2Tw), and when the frequency of the wobble signal is represented by fw, the bandwidth of the modulated signal is fw. The period Tpid of PID data increases, the bandwidth of a modulated signal decreases, thereby decreasing interference with peripheral signals. However, as the period Tpid increases, the efficiency of a modulated signal decreases, and the amount of recordable PID data decreases. Accordingly, it is preferable that 1Tw<Tpid<4Tw.

Figure 7A:
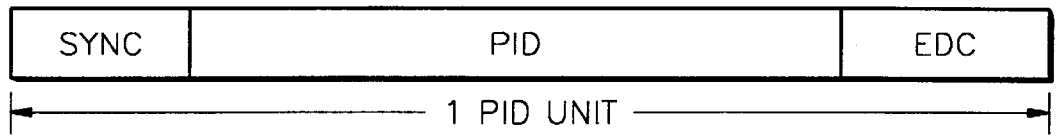
FIGS. 7A through 7C show an example of the contents of the PID addressing structure shown in FIG. 4.
Figure 7B:
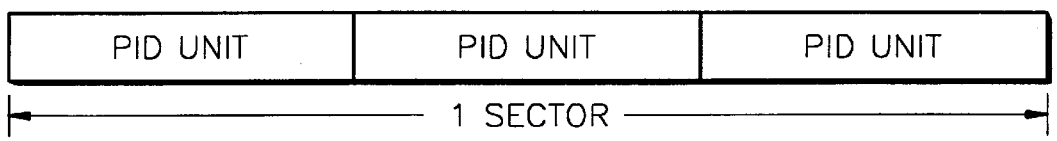
Figure 7C:
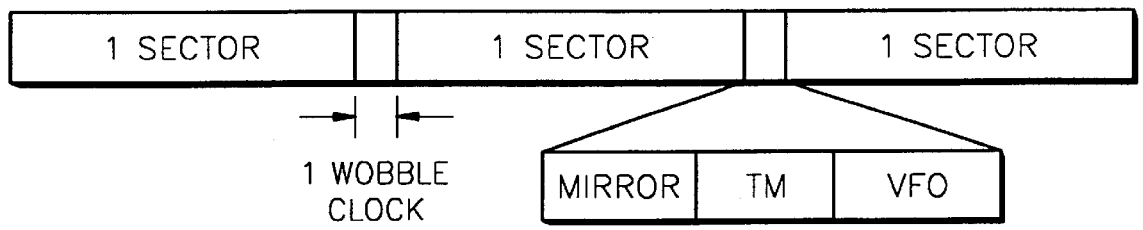

FIGS. 7A through 7C are diagrams showing an example of the contents of a wobble PID according to the PID addressing structure of FIG. 4. As shown in FIG. 7A, a PID unit comprises a wobble sync having synchronization information for determining the start position of a wobble PID signal, a PID which is phase-modulated using a wobble carrier having address information and is multiplexed with the wobble carrier at a predetermined time interval, and an EDC. In FIG. 4, 1-bit PID data and a simple wobble carrier are multiplexed.

It is preferable that address data (PID) is repeated at least three times in a sector, as shown in FIG. 7B. This is for enhancing the robustness of the address data against erroneous correction or erroneous detection. Accordingly, it is preferable that the same PID unit including an address is repeated three or more times during a single sector period.

As shown in FIG. 7C, a sector mark for indicating the beginning of a physical sector is provided at the beginning of a sector. The sector mark includes a mirror zone (MIRROR), a track mark (TM) having information on a track in which a corresponding sector is currently located, and a VFO signal (VFO) for PLL of data to be recorded in a corresponding sector, for 1 wobble clock period. The mirror zone is on the path of a recording and reproducing beam on a disc, does not have any signal or information, and just reflects an incident beam with a predetermined reflectance. In this mirror zone, refraction due to a pit, record mark or a land/groove structure does not occur, so that an output signal read from the mirror zone is the strongest.

In a wobble PID structure according to the present invention, synchronization information for detecting the beginning of address information (PID) and detecting the phase of a wobble carrier is provided before the address information in order to prevent a temporary failure in achieving a PLL or a temporary asynchronous clock phase from influencing adjacent address information. It is preferable that synchronization information can be detected after data demodulation as well as when the data has been modulated. Accordingly, in the present invention, synchronization information for address information exists in the form of a wobble sync using a Barker-Code which is a sort of a pseudo-random sequence. A method of constructing and detecting a Barker-Code and a synchronizing signal is disclosed in U.S. Pat. No. 5,511,099, entitled "Passband Sync Block Recovery" and issued to the present applicant, and thus a detailed description thereof will be omitted.

Figure 8:
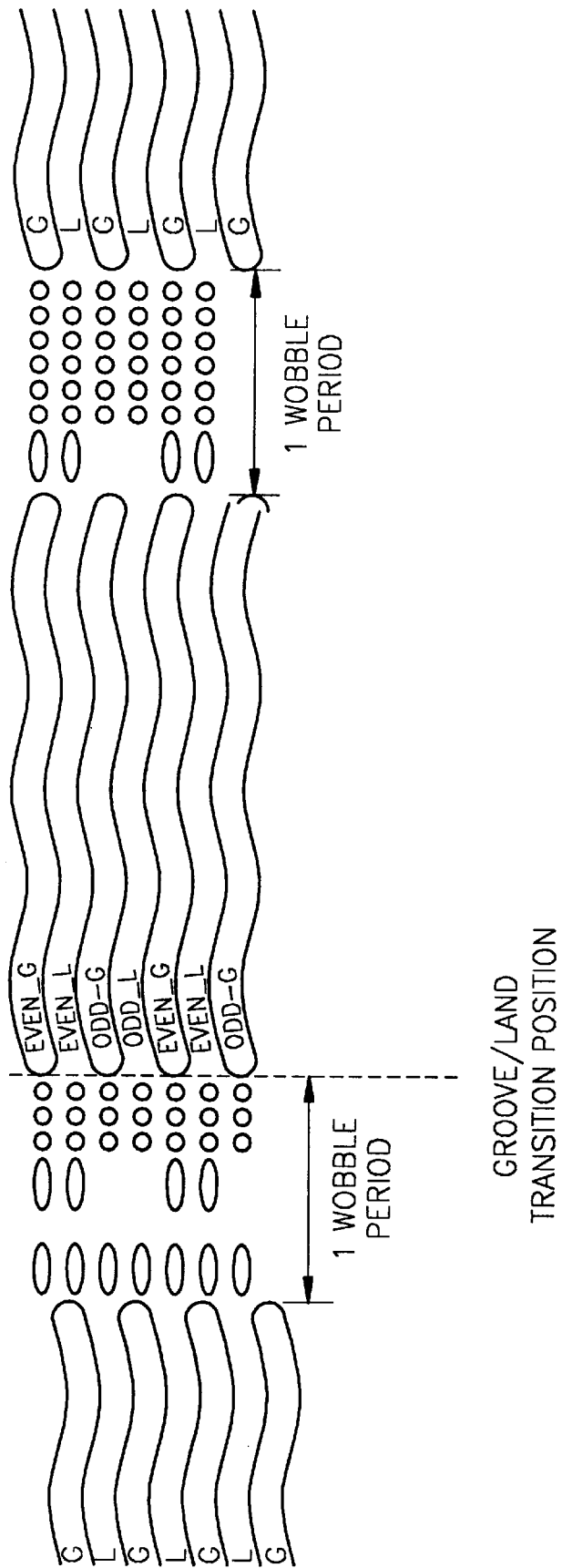
FIG. 8 is a diagram showing a sector mark located at the beginning of a sector and a first sector mark of a track as an example of the track structure shown in FIG. 6.

FIG. 8 is a schematic diagram showing the shapes of a sector mark located at the beginning of a sector and the first sector mark of a track, in the track structure shown in FIG. 6. FIG. 8 shows a first sector mark (a zero sector mark or a reference sector mark), which is located at a transition position from a groove track to a land track or from a land track to a groove track, that is, at the beginning of a track, and a sector mark located at the beginning of a sector. Sector marks are provided to land tracks as well as groove tracks and have different structures in odd tracks and even tracks. The first sector mark of a track has a different structure to the other sector marks of the track.

The sector mark indicates whether a current track to be written to or read from is an even or odd track and indicates the start point of the corresponding track. According to the structure of the present invention, it is detected whether a current track is an even or odd track or a land or groove track, after demodulation of address data. In other words, by multiplexing an address and a wobble carrier such that the size of a land address is larger or smaller than a groove address in a land track, a land track can be discriminated from a groove track based on the correlation between the sizes of the land and groove addresses.

When it can be detected whether a current track is an odd or even track or a land or groove track even if address information is normally demodulated and is not read, it can be known whether an address is erroneously read, and a reading rate can be increased.

Figure 9A:
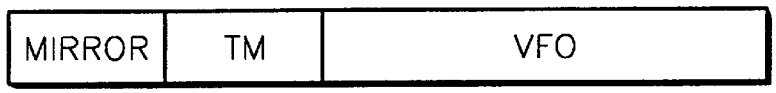
Figure 9B:

As shown in FIG. 9A, the sector mark of an even groove track or an even land track includes a mirror zone, a track mark and a VFO signal. As shown in FIG. 9B, unlike the sector mark of an even groove track or an even land track, the sector mark of an odd groove track or an odd land track includes a mirror zone instead of a track mark. That is, the sector mark of an odd groove track or an odd land track sequentially includes a mirror zone, another mirror zone and a VFO signal. The sector mark of an even track shown in FIG. 9A may be the sector mark of an odd track shown in FIG. 9B, and the sector mark of an odd track shown in FIG. 9B may be the sector mark of an even track shown in FIG. 9A. Another modification is also possible.

Figure 9C:
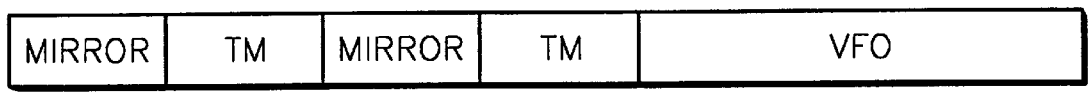

As shown in FIG. 9C, the first sector mark of an even track, which has information on a reference sector indicating the beginning of a track, includes a mirror zone and a track mark in addition to the structure of the sector mark of an even track (FIG. 9A). That is, a mirror zone, track mark, mirror zone, track mark and a VFO signal are sequentially arranged.

Figure 9D:

As shown in FIG. 9D, the first sector mark of an odd track includes a mirror zone and a track mark in addition to the structure of the sector mark of an odd track (FIG. 9B). That is, a mirror zone, track mark, mirror zone, mirror zone and a VFO signal are sequentially arranged. The first sector mark of an even track shown in FIG. 9C can be interchanged with the first sector mark of an odd track shown in FIG. 9D, and another modification is also possible.

FIG. 9E shows a sector mark (SM) and PID structure when each track has m sectors. Sector marks are provided to not only groove tracks but also land tracks, and a PID unit is repeated three times in each groove track.

The following description concerns generation and detection of an address using wobbles that are independently formed on both walls of each of land and groove tracks according to the present invention.

Figure 10:
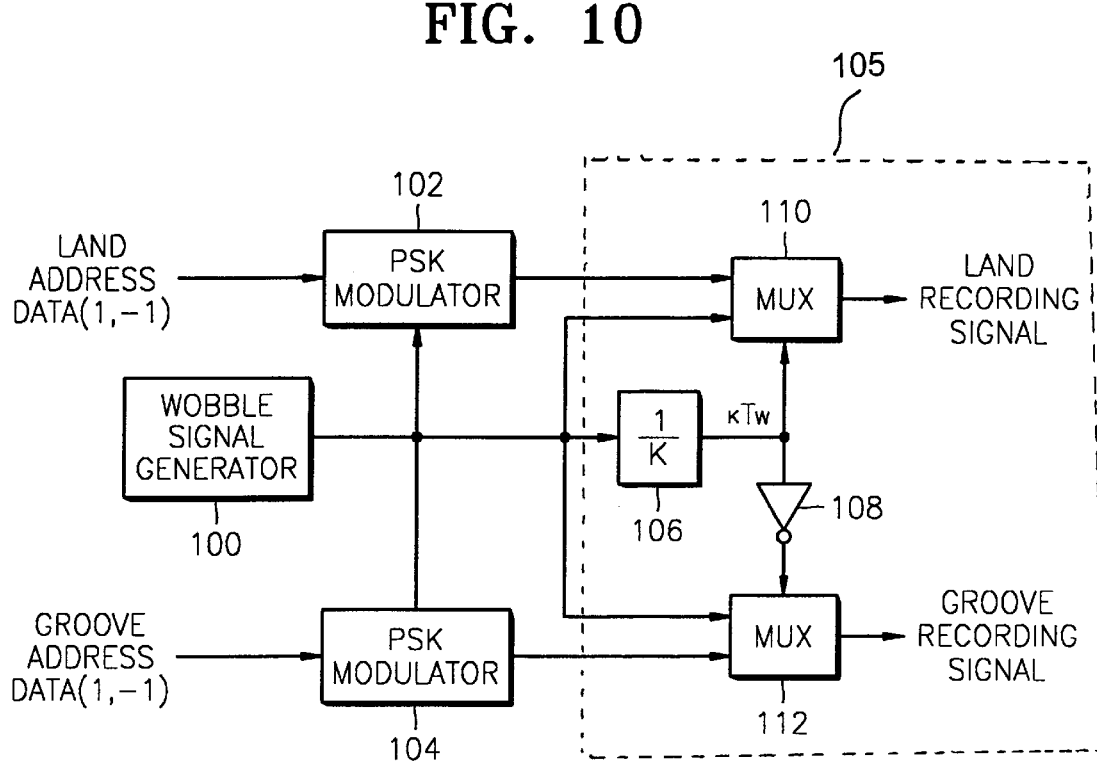
FIG. 10 is a circuit diagram of a wobble address encoding circuit according to an embodiment of the present invention.

FIG. 10 is a circuit diagram of a wobble address encoding circuit according to an embodiment of the present invention. The wobble address encoding circuit includes a wobble signal generator 100, PSK modulators 102 and 104, and a time division multiplexer 105 having a divider 106, an inverter 108 and multiplexers (MUXs) 110 and 112.

In FIG. 10, the wobble signal generator 100 generates a wobble signal having a predetermined wobble frequency fw. The PSK modulator 102, which can be manifested as a multiplier, multiplies the wobble signal generated by the wobble signal generator 100 by land address data of "1" or "−1". The PSK modulator 104 multiplies the wobble signal generated by the wobble signal generator 100 by groove address data of "1" or "−1".

The divider 106 divides the frequency (f=1/Tw) of the wobble signal generated by the wobble signal generator 100 by k to generate a multiplexing period kTw at which a wobble and phase-modulated address data are multiplexed. The inverter 108 inverts the output of the divider 106. The MUX 110 multiplexes the phase modulated address data and the wobble signal having only a carrier, which is generated by the wobble signal generator 100, in an order of, for example, the phase modulated address data and the wobble signal, according to the multiplexing period kTw provided by the divider 104, thereby providing a recording signal for a land track.

On the other hand, the MUX 112 multiplexes the wobble signal having only a carrier, which is generated by the wobble signal generator 100, and the phase modulated groove address data provided by the PSK modulator 104 in order of the wobble signal and the phase modulated groove address data, thereby providing a recording signal for a groove track.

Figure 11:
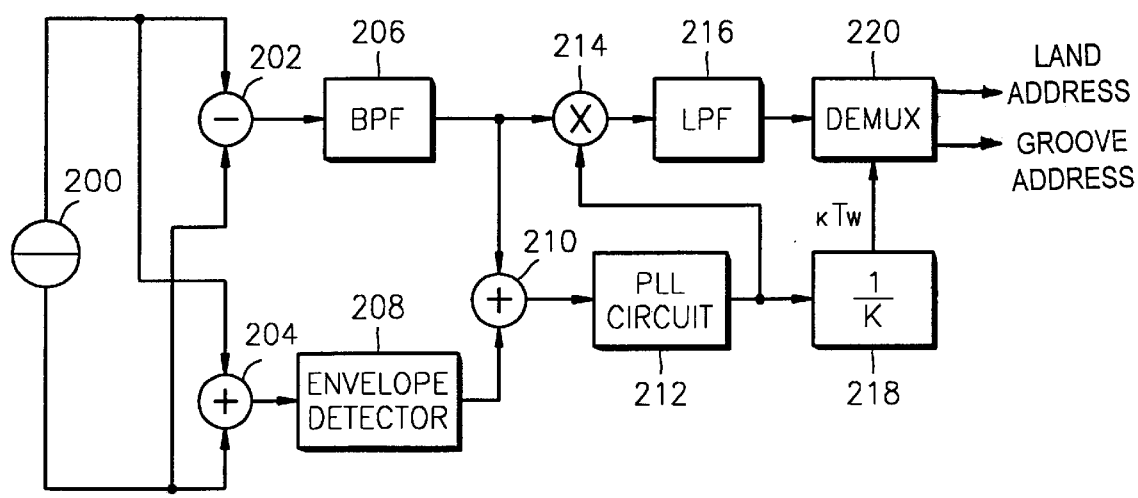
FIG. 11 is a circuit diagram of a wobble address detecting circuit according to an embodiment of the present invention.

FIG. 11 is a circuit diagram of a wobble address detecting circuit according to an embodiment of the present invention. The wobble address detecting circuit includes an optical detecting device 200, a subtractor 202, adders 204 and 210, a band pass filter (BPF) 206, an envelope detector 208, a phase locked loop (PLL) circuit 212, a multiplier 214, a low pass filter (LPF) 216, a divider 218 and a demultiplexer (DEMUX) 220.

The subtractor 202 detects a difference signal (a push-pull signal) between the radially half-divided output signals of the optical detecting device 200 which may be a photodiode. The adder 204 detects a sum signal of the radially half-divided output signals of the optical detecting device 200.

The BPF 206 filters the push-pull signal, and the envelope detector 208 detects the envelope of the sum signal. The adder 210 sums the output of the BPF 206 and the output of the envelope detector 208.

The PLL circuit 212 detects a wobble clock signal from the output of the adder 210. The multiplier 214 multiplies the band-filtered push-pull signal provided by the BPF 206 by the wobble clock signal provided by the PLL circuit 212. Then, as shown in Equation (4), an original signal expressed as a DC term and a multiplied harmonic component are generated. The multiplier 214 can be referred to as a phase demodulator.

The LPF 216 detects an original signal component (a phase component), which remains after the harmonic component is filtered, from the output of the multiplier 214. The divider 218 divides the wobble clock signal provided by the PLL circuit 212 by k and provides the divided wobble signal, i.e., the multiplexing period kTw signal to the DEMUX 220. The DEMUX 220 demultiplexes the output of the LPF 216 in a period kTw provided by the divider 218 and provides a land address and a groove address.

Figure 12A:
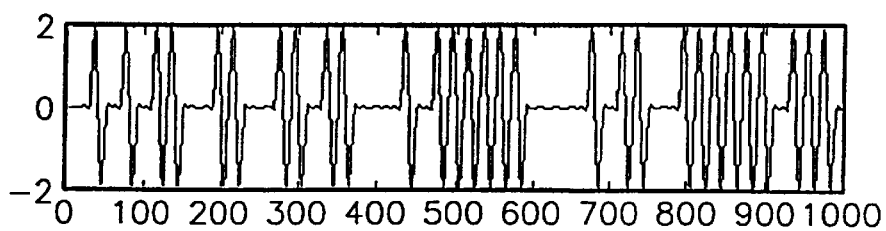
FIGS. 12A through 12I are waveform diagrams showing the waveforms of members of the detecting circuit shown in FIG. 11.
Figure 12B:
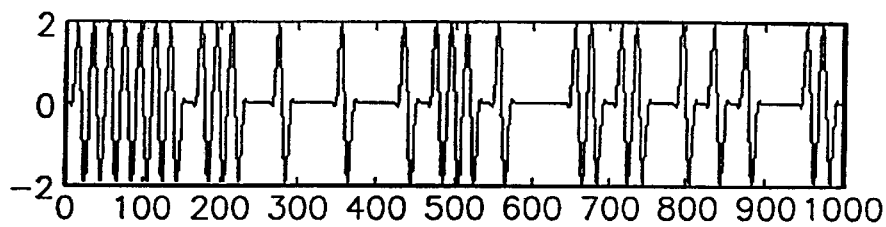
Figure 12C:
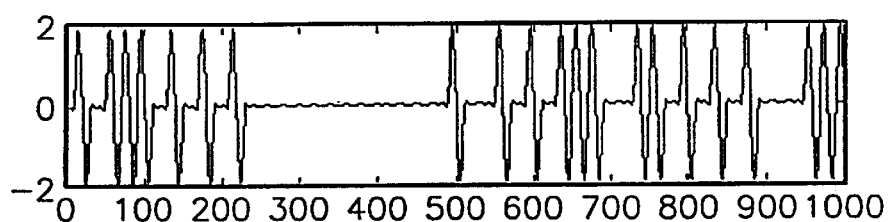

With respect to a wobble signal as shown in FIG. 5 generated in the structure shown in FIG. 4, a signal shown in FIG. 12A which is read from a groove track in which a groove 1 address and a land 1 address are multiplexed, is detected from the push-pull signal of the subtractor 202. Signals shown in FIG. 12B which are read from a land track in which the groove 1 address and a land 2 address are multiplexed, are detected from the push-pull signal of the subtractor 202. A signal shown in FIG. 12C which is read from a groove track in which a groove 2 address and the land 2 address are multiplexed, is detected from the push-pull signal of the subtractor 202.

Figure 12D:
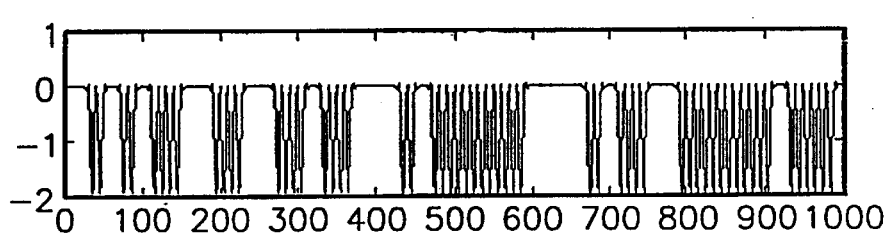
Figure 12E:
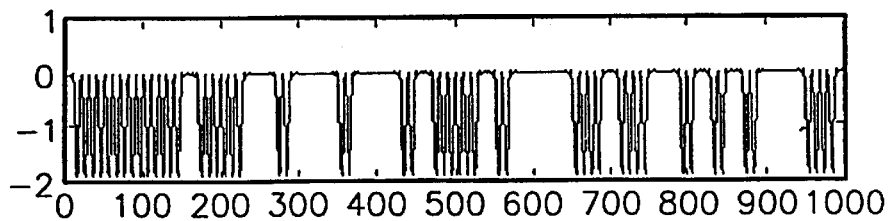
Figure 12F:
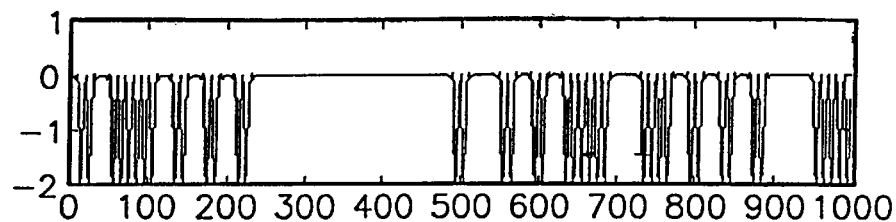

A signal shown in FIG. 12D is output from the multiplier 214 and is the result of multiplying the groove track signal of FIG. 12A by $\sin(\omega t)$. A signal shown in FIG. 12E is output from the multiplier 214 and is the result of multiplying the land track signal of FIG. 12B detected from the push-pull signal by $\sin(\omega t)$. A signal shown in FIG. 12F is output from the multiplier 214 and is the result of multiplying the signal of FIG. 12C read from a groove track by $\sin(\omega t)$.

Figure 12G:
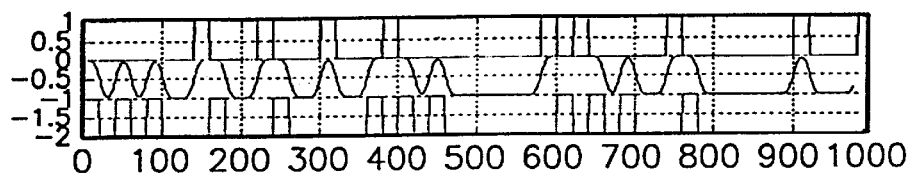
Figure 12H:
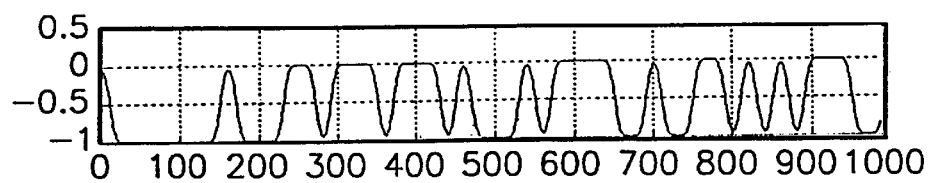
Figure 12I:
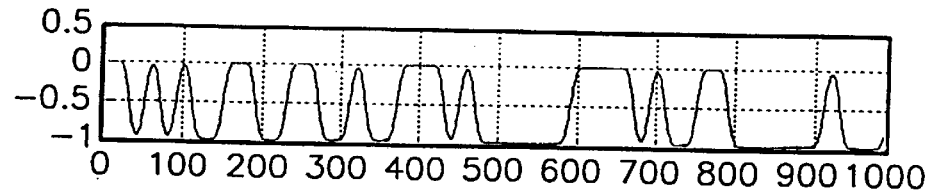

FIG. 12G shows the multiplexed groove 1/land 1 address information detected from a groove track and provided from the LPF 216. FIG. 12H shows the multiplexed groove 1/land 2 address information detected from a land track. FIG. 12I shows the multiplexed groove 2/land 2 address information detected from a groove track.

Meanwhile, when consecutive zeros occur in a data stream in which the address data of a groove track is multiplexed, a wobble is not generated from a push-pull signal in an adjacent land track so that a PLL circuit may not operate. Accordingly, it is preferable to perform run length limited (RLL) coding to prevent input address data from being consecutive ones or zeros, and it is preferable to use a wobble detected from a sum signal to make the PLL circuit smoothly operate.

The present invention can be effectively applied to high density optical recording and reproducing systems.

In the embodiment described above, address data is multiplexed in units of bits, but it may be multiplexed in units of a plurality of bits. When address data is multiplexed in units of a plurality of bits, only the structures of a multiplexer and a demultiplexer are changed from the present embodiment.

In the above embodiment, for clear understanding, two kinds of phase differences, i.e., 0 degrees and 180 degrees, are used in phase modulating address data, but address data may be phase modulated to have phase differences of 90 degrees and 270 degrees with respect to a wobble carrier. When the phase difference between adjacent groove tracks is 90 degrees or 270 degrees, a wobble signal does not disappear in a land track. In this case, synchronous detection is difficult, but a wobble signal does not consecutively disappear so that the utility of a wobble signal can be increased.

In addition, when modulated phase angles may be set to, for example, 45 degrees and 90 degrees such that the phase difference of two signals is smaller than a maximum (180 degrees), a change in the phase of a wobble signal can be decreased so that a bandwidth can be decreased. In this structure, a problem that a wobble signal is not output when opposite phases are continued in adjacent tracks can be solved. To solve the problem of a wobble signal not being output, a two-dimensional convolution code may be used to prevent the phenomenon in which data of adjacent tracks have opposite phases from consecutively occurring.

In the present invention, not only is one address information recorded in a single area, for example, the address of a sector is recorded in an area corresponding to the single sector in a groove track, but also the address of a corresponding sector in an adjacent land track may be recorded in the sector area. Similarly, the address of an adjacent groove track may be recorded in a land track in addition to the address of the land track. The address of a corresponding sector in an adjacent land track may vary with the length of the sector and the characteristics of a modulated signal. Through such a method, a plurality of addresses can be read while a single sector is being read so that, even if one of groove address information and land address information cannot be read, the address information that cannot be read can be inferred from the address information that is read and other disc information.

As described above, the present invention establishes a particular correlation between the phases of adjacent tracks such that a wobble address can be read from any track, and provides a simple method and circuit for detecting the wobble address. In addition, the present invention can solve the overhead problem of a PID addressing method using conventional embossed pre-pits, and can solve the problem that a conventional wobble address method cannot be applied to a land and groove recording method.

In addition, the present invention multiplexes a phase modulated address and a wobble signal having only a carrier and independently records them in land and groove tracks by using two beams so that land and groove addresses can be detected by the same method. A land track can be easily discriminated from a groove track by multiplexing a phase modulated address and a wobble carrier in different orders in a land track and a groove track and making the sizes of addresses different in land and groove tracks.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of addressing physical identification information using wobble signals on an optical recording medium having land and groove tracks, the method comprising:

alternately recording a simple wobble carrier and wobble address information on both walls of either of a groove track and a land track, the wobble address information being phase modulated with two phases having a phase difference therebetween using the simple wobble carrier, wherein the simple wobble carrier is recorded in a section of an adjacent track corresponding to a section in which the wobble address information is recorded in a current track.

2. The method of claim 1, wherein the two phases have a maximum phase difference therebetween and are 0 and 180 degrees, or 90 and 270 degrees.

3. The method of claim 1, wherein the two phases have a phase difference which is less than a maximum possible phase difference.

4. The method of claim 1, wherein the alternately recording comprises alternately recording the wobble carrier and the wobble address information in different orders in one of the land tracks and and an adjacent one of the groove tracks such that the wobble address information is not recorded in a section of the groove track corresponding to a section of the land track in which the wobble address information is recorded.

5. The method of claim 4, wherein the wobble address information of the groove track includes groove address information on the groove track, and land address information on the adjacent land track, and the wobble address information of the land track includes land address information on the land track, and groove address information on the adjacent groove track.

6. The method of claim 1, further comprising recording information in predetermined units for synchronizing an initial phase of a wobble signal in each track of the optical recording medium.

7. The method of claim 1, wherein the groove and land tracks each comprise minimum recording units, and the method further comprises repeatedly recording the wobble address information three or more times in each of the minimum recording units.

8. The method of claim 1, wherein each of the wobble address information comprises a wobble sync having synchronization information for determining a beginning of physical identification data (PID), the PID being phase modulated with the wobble carrier having address information and is multiplexed with the wobble carrier at a predetermined time interval, and an error detection code.

9. The method of claim 8, wherein a period of the PID is equal to or larger than a period of the wobble carrier and smaller than four times the period of the wobble carrier.

10. The method of claim 8, wherein a period of the wobble carrier is larger than 50 times a period of channel data and smaller than 450 times the period of the channel data, the channel data being actually recorded on the optical recording and reproducing medium.

11. The method of claim 8, wherein the wobble sync is detectable in a modulated state and/or after demodulation.

12. The method of claim 8, wherein the wobble sync comprises a pseudo-random sequence.

13. The method of claim 12, wherein the wobble sync comprises a Barker-Code.

14. The method of claim 1, wherein the groove and land tracks each comprise minimum recording units, the method further comprising recording a sector mark at a beginning of each of the minimum recording units in each track.

15. The method of claim 14, wherein the groove tracks comprise odd and even groove tracks and the land tracks comprise odd and even land tracks, and the structures of the sector marks are different in the even groove and land tracks as opposed to the odd groove and land tracks, and a structure of the first sector mark of each track is different from the structure of any of the other sector marks in the same track.

16. The method of claim 15, wherein the sector mark of each of the even groove and land tracks comprises a mirror zone, a track mark having information for discriminating an even track from an odd track, and a variable frequency oscillator (VFO) signal having phase synchronization information, and the sector mark of each of the odd groove and land tracks comprises the mirror zone, another mirror zone and the VFO signal.

17. The method of claim 15, wherein the first sector mark of each of the even groove and land tracks comprises a mirror zone, a track mark, another mirror zone, another track mark and a VFO signal, and the first sector mark of each of the odd groove and land tracks comprises the mirror zone, the track mark, another mirror zone, still another mirror zone and the VFO signal.

18. A method of detecting a wobble address from an optical recording medium, in which a simple wobble carrier and address information, which is phase modulated with two phases having a phase difference therebetween using the simple wobble carrier, are alternately recorded on both walls of either of a groove track and a land track, and the simple wobble carrier is recorded in a section of an adjacent track corresponding to a section in which the phase modulated address information is recorded in a current track, in an optical recording and reproducing system having an optical detecting device, the method comprising the steps of:

recovering the wobble carrier from a sum of a sum signal and a push-pull signal of radially half-divided output signals of the optical detecting device;

providing an output signal having an original signal component and a harmonic component by multiplying the push-pull signal by the wobble carrier; and removing the harmonic component from the output signal and demultiplexing the original signal component to recover land and groove address information.

19. The method of claim 18, further comprising discriminating the land track from the groove track based on a correlation between sizes of the land address information and the groove address information that are recovered.

20. A circuit for encoding an address using a wobble in an optical recording and reproducing system, the circuit comprising:

a generator which generates a wobble signal having only a simple wobble carrier;

a phase modulator which phase modulates land and groove address information indicating physical identification information with two phases of the wobble signal having a phase difference; and a time division multiplexer which time division multiplexes the wobble signal and the phase modulated land and groove address information in both walls of either of a groove track and a land track, at a predetermined time interval.

21. The circuit of claim 20, wherein the two phases have a maximum phase difference therebetween and are 0 and 180 degrees, or 90 and 270 degrees.

22. The circuit of claim 20, wherein the two phases have a phase difference which is less than a maximum possible phase difference.

23. The circuit of claim 20, wherein the time division multiplexer time division multiplexes the wobble carrier and the wobble address information according to a groove/land discrimination signal such that the wobble carrier and the wobble address information are alternately recorded in different orders on the land track and the groove track so that the wobble address information is not recorded in a section of the groove track corresponding to a section of the land track, adjacent to the groove track, in which the wobble address information is recorded.

24. The circuit of claim 20, wherein address data of the groove track comprises the groove address information on the groove track, and the land address information on the adjacent land track, and address data of the land track comprises the land address information on the land track, and the groove address information on the adjacent groove track.

25. The circuit of claim 20, wherein the land track and the groove track each comprises minimum recording units, and the wobble address information is repeatedly recorded three or more times in each of the minimum recording units.

26. The circuit of claim 20, wherein the land and groove address information each comprises a wobble sync having synchronization information for determining a beginning of physical identification data (PID), the PID being phase modulated with the wobble carrier having address information and is multiplexed with the wobble carrier at a predetermined time interval, and an error detection code.

27. The circuit of claim 26, wherein a period of the PID is equal to or larger than a period of the wobble carrier and smaller than four times the period of the wobble carrier.

28. The circuit of claim 26, wherein a period of the wobble carrier is larger than 50 times a period of channel data and smaller than 450 times the period of the channel data, the channel data being recorded on the optical recording medium.

29. The circuit of claim 26, wherein the wobble sync is detectable in a modulated state and/or after demodulation.

30. The circuit of claim 26, wherein the wobble sync comprises a pseudo-random sequence.

31. The circuit of claim 30, wherein the wobble sync comprises a Barker-Code.

32. The circuit of claim 20, wherein the land track and groove track each comprises minimum recording units, and a sector mark is recorded at a beginning of each of the minimum recording units in each track during mastering of the optical recording medium.

33. The circuit of claim 32, wherein the optical recording medium comprises odd groove and land tracks and even groove and land tracks, and structures of the sector marks are different in the even groove and land tracks as opposed to the odd groove and land tracks, and a structure of the first sector mark of each track is different from the structure of any of the other sector marks in the same track.

34. The circuit of claim 33, wherein the sector mark of each of the even groove and land tracks comprises a mirror zone, a track mark having information for discriminating an even track from an odd track, and a variable frequency oscillator (VFO) signal having phase synchronization information, and the sector mark of each of the odd groove and land tracks comprises the mirror zone, another mirror zone and the VFO signal.

35. The circuit of claim 33, wherein a first sector mark of each of the even groove and land tracks comprises a mirror zone, a track mark, another mirror zone, another track mark and a VFO signal, and a first sector mark of each of the odd groove and land tracks comprises the mirror zone, the track mark, another mirror zone, still another mirror zone and the VFO signal.

36. A circuit for detecting a wobble address from an optical recording medium, in which a simple wobble carrier and address information, which is phase modulated with two phases having a phase difference therebetween using the simple wobble carrier, are alternately recorded on both walls of either of a groove track and a land track, and the simple wobble carrier is recorded in a section of an adjacent track corresponding to a section in which the phase modulated address information is recorded in a current track, in an optical recording and reproducing system having an optical detecting device, the circuit comprising:

a wobble clock recoverer which detects a wobble clock signal from a sum of a sum signal and a push-pull signal of radially half-divided output signals of the optical detecting device;

a phase demodulator which provides an output signal having an original signal component and a harmonic component by multiplying the push-pull signal by the wobble clock signal; and a demultiplexer which low pass filters the harmonic component of the output signal and demultiplexes the original signal component to recover land and groove address information.

37. The circuit of claim 36, wherein the demultiplexer discriminates the land track from the groove track based on a correlation between sizes of recovered land address information and the recovered groove address information.

38. A recording and reproducing medium employing a groove and land recording method, comprising:

land and groove tracks; and simple wobble carrier and wobble address information alternately recorded on both walls of either of one of the groove tracks or one of the land tracks, the wobble address information being phase modulated with two phases having a phase difference therebetween using the simple wobble carrier, and the simple wobble carrier is recorded in a section of an adjacent track corresponding to a section in which the wobble address information is recorded in a current track.

39. The recording medium of claim 38, wherein the two phases have a maximum phase difference therebetween of 0 and 180 degrees, or 90 and 270 degrees.

40. The recording medium of claim 38, wherein the two phases have a phase difference which is less than a maximum possible phase difference.

41. The recording medium of claim 38, further comprising an area which synchronizes an initial phase of the wobble carrier in each of predetermined units in each groove track.

42. The recording medium of claim 38, wherein the wobble address information of the groove track comprises groove address information on the groove track, and land address information on the land track which is adjacent thereto, and the wobble address information of the land track includes land address information on the land track, and groove address information on the adjacent groove track.

43. The recording medium of claim 38, wherein the land track is discriminated from the groove track based on a correlation between sizes of the wobble address information on the land and groove tracks.

44. The recording medium of claim 38, wherein the land and groove tracks each comprises minimum recording units, and the wobble address information is repeatedly recorded three or more times in each of the minimum recording units.

45. The recording medium of claim 38, wherein the wobble address information each comprises a wobble sync having synchronization information for determining a beginning of physical identification data (PID), the PID being phase modulated with the wobble carrier having address information and is multiplexed with the wobble carrier at a predetermined time interval, and an error detection code.

46. The recording medium of claim 45, wherein a period of the PID is equal to or larger than a period of the wobble carrier and smaller than four times the period of the wobble carrier.

47. The recording medium of claim 45, wherein a period of the wobble carrier is larger than 50 times a period of channel data and smaller than 450 times the period of the channel data, the channel data being recorded on the recording medium.

48. The recording medium of claim 45, wherein the wobble sync is detectable in a modulated state and/or after demodulation.

49. The recording medium of claim 45, wherein the wobble sync comprises a pseudo-random sequence.

50. The recording medium of claim 49, wherein the wobble sync comprises a Barker-Code.

51. The recording medium of claim 38, wherein groove and land tracks each comprises minimum recording units, and a sector mark is disposed at a beginning of each of the minimum recording units in each track.

52. The recording medium of claim 51, wherein the optical recording medium comprises odd groove and land tracks and even groove and land tracks, and structures of the sector marks are different in the even groove and land tracks as opposed to the odd groove and land tracks, and the structure of a first sector mark of each track is different from the structure of any of the other sector marks in the same track.

53. The recording medium of claim 52, wherein the sector mark of each of the even groove and land tracks comprises a mirror zone, a track mark having information for discriminating an even track from an odd track, and a variable frequency oscillator (VFO) signal having phase synchronization information, and the sector mark of each of the odd groove and land tracks comprises the mirror zone, another mirror zone and the VFO signal.

54. The recording medium of claim 52, wherein a first sector mark of each of the even groove and land tracks comprises a mirror zone, a track mark, another mirror zone, another track mark and a VFO signal, and a first sector mark of each of the odd groove and land tracks comprises the mirror zone, the track mark, another mirror zone, still another mirror zone and the VFO signal.

55. The circuit of claim 20, wherein the time division multiplexer comprises:

a divider to divide the wobble signal, to generate a multiplexed period;

an inverter to invert the multiplexed period; and a multiplexer which multiplexes the wobble signal and the phase modulated land address information based on the multiplexed period, to time division multiplex a land recording signal in one of the two walls, and multiplexes the wobble signal and the phase modulated groove address information based on the inverted multiplexed period, to time division multiplex a groove recording signal in the other one of the two walls.

56. The circuit of claim 55, wherein the land and groove address information is "1" or "−1".

57. The circuit of claim 55, wherein the multiplexer first selects the phase modulated land address information and then repeatedly selects the wobble signal and the phase modulated land address information to generate the land recording signal, and first selects the wobble signal and then repeatedly selects the phase modulated groove address information and the wobble signal to generate the groove recording signal.

58. The circuit of claim 20, wherein the time division multiplexer comprises:

a divider to divide the wobble signal, to generate a multiplexed period;

an inverter to invert the multiplexed period; and a multiplexer which multiplexes the wobble signal and the phase modulated groove address information based on the multiplexed period, to time division multiplex a groove recording signal in one of the two walls, and multiplexes the wobble signal and the phase modulated land address information based on the inverted multiplexed period, to time division multiplex a land recording signal in the other one of the two walls.

59. The circuit of claim 58, wherein the land and groove address information is "1" or "−1".

60. The circuit of claim 58, wherein the multiplexer first selects the phase modulated groove address information and then repeatedly selects the wobble signal and the phase modulated groove address information to generate the groove recording signal, and first selects the wobble signal and then repeatedly selects the phase modulated land address information and the wobble signal to generate the land recording signal.

61. The circuit of claim 36, wherein the wobble clock recoverer comprises:

a bandpass filter which filters the push-pull signal;

an envelope detector which detects an envelope of the sum signal;

an adder which adds the filtered push-pull signal and the envelope, to generate an added signal; and a phase locked loop circuit which detects the wobble clock signal from the added signal;

wherein the phase demodulator generates the output signal having the original signal and the harmonic component by multiplying the filtered push-pull signal by the wobble clock signal.

62. The circuit of claim 61, further comprising a divider which divides the wobble clock signal, wherein the demultiplexer outputs the land and groove address information based upon the divided wobble clock signal.

63. The recording medium of claim 38, wherein the two phases have a phase difference of 45 and 90 degrees.

64. A method of address physical identification information on a recording medium, comprising:

generating a simple wobble carrier;

phase modulating groove and land address information based upon phases of the simple wobble carrier; and time division multiplexing the simple wobble carrier and the phase modulated groove address information according to either a groove track or a land track of the recording medium and the simple wobble carrier and the phase modulated land address information according to the other one of the groove or the land track.

65. A recording medium comprising:

land tracks;

groove tracks;

a simple wobble carrier; and phase modulated land and groove wobble information which are phase modulated according to phases of the simple wobble carrier;

wherein the simple wobble carrier and the phase modulated groove wobble information are time division multiplexed into one of two walls of one of the land tracks or one of the groove tracks and the simple wobble carrier and the simple wobble carrier and the phase modulated land wobble information are time division multiplexed in the other one of the two walls.

66. The method of claim 1, wherein a period of the wobble address information is at least longer than a period of the simple wobble carrier.

67. The method of claim 1, further comprising:

detecting the two phases by multiplying the phase modulated wobble address information by the simple wobble carrier, and detecting a size of the multiplied signal in a predetermined period.

68. The method of claim 1, wherein the land or groove track is divided into error correction blocks each comprising a plurality of sectors, wherein a size of each sector is 4, 8 or 16 Kbytes and a size of the error correction block is 32 Kbytes.

69. The method of claim 64, wherein the phase modulated land and groove address information is 1-bit data.

70. The method of claim 64, wherein the phase modulated land and groove address information is multi-bit data.

* * * * *